Oct. 23, 1945.  M. P. TAYLOR  2,387,542
FREIGHT HANDLING APPARATUS ON VEHICLE
Filed May 12, 1944

INVENTOR.
MORRIS P. TAYLOR
BY
Boyken, Mohler & Beckley
ATTORNEYS.

Patented Oct. 23, 1945

2,387,542

UNITED STATES PATENT OFFICE 2,387,542

FREIGHT HANDLING APPARATUS ON VEHICLES

Morris P. Taylor, Stanford University, Calif.

Application May 12, 1944, Serial No. 535,388

8 Claims. (Cl. 214—65)

This invention relates to freight handling apparatus on vehicles such as land, water and air craft. The apparatus is intended to have the advantages of the apparatus described in my United States Letters Patent No. 2,088,122, of July 27, 1937, and in addition, the invention herein has as an object the provision of means for more efficiently loading freight carriers, containers or the like, in various parts of the vehicle being loaded therewith. Another object of the invention is the provision of improved safety means for locking the freight handling apparatus in the vehicle that carries the same whereby the vehicle cannot be accidentally started before such apparatus is secured therein.

Other objects and advantages will appear in the description and in the drawing, it being understood that the illustration herein and the description thereof are not to be considered restrictive of the invention.

Figure 1:
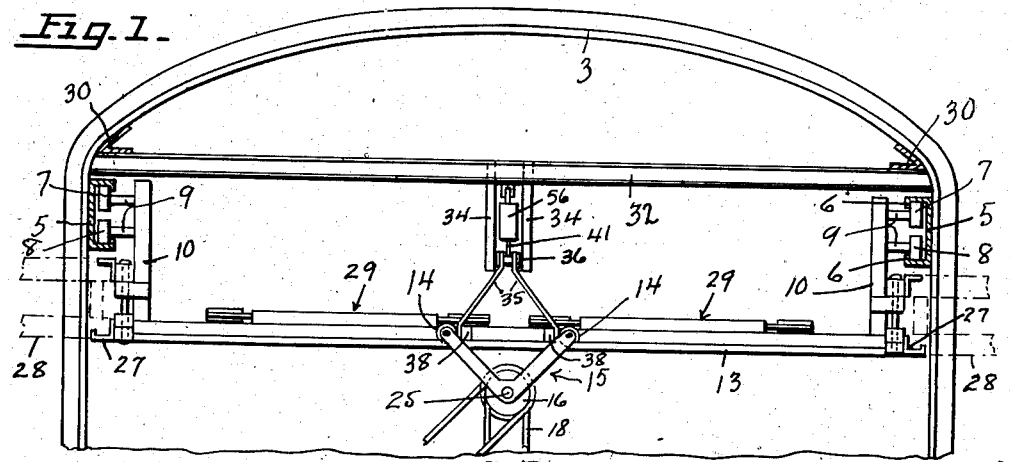
Fig. 1 is a sectional view through the body of a vehicle showing the apparatus locked therein against movement.

In detail, the body of the vehicle comprises a floor 1 and an upstanding frame 2 secured thereto. The frame may comprise a plurality of overhead cross members 3 supported over floor 1 by pairs of posts 4. Only one pair of such posts and one cross member is shown in Fig. 1, it being understood that others are in alignment therewith and are duplicates thereof, such structure being conventional.

The frame 2 carries a pair of parallel rail members 5 respectively secured to the upper ends of posts 4 in opposed relation and parallel with floor 1 thereby providing a track for the wheels or rollers of a carriage. Each of the members 5 is in the form of a channel strip (Fig. 1) and the members of said pair are arranged with their open sides directed laterally and toward each other. Flanges 6 on the free edges of the opposite upper and lower sides of each strip or member 5 are directed toward each other whereby each strip provides an upper and a lower channel-like runway for the rollers 7, 8 of a carriage.

The upper roller 7 of each pair thereof rolls against the upper side of each member 5 while the lower roller 8 is supported on the lower side. The flanges 6 retain the rollers against coming out of the members. Each of the rollers 7, 8 is rotatably supported on one of the ends of a shaft 9, there being a shaft for each roller, and the opposite end of each shaft 9 is secured to the upper end of a depending carriage support 10. There are preferably four pairs of rollers 7, 8. Two of such pairs are in each of the two members 5 (Fig. 2) and there is a support 10 for each pair, the said supports at each side of the vehicle being respectively connected by frame elements 12.

The opposed supports 10 at opposite sides of the vehicle are connected by a pair of rails 13, which rails are each formed to provide an upwardly opening channel for a pair of rollers 14 (Fig. 1) of a hoist device 15. A pair of rollers 14 is supported on each rail 13 and the two pairs of such rollers support a hoist device suspended therefrom as fully described in detail in my above mentioned patent, No. 2,088,122.

The device 15 includes pulleys 16, 17, the latter being below pulley 16 and suspended therefrom by a portion 18 of a rope, cable, or chain that is arranged to provide a conventional differential pulley hoist. Pulley 16 is carried by rollers 14 while pulley 17 carries a frame 19 having depending arms 20 that are adapted to releasably engage hooks or the like, on a portable carrier 21. Several rows of such carriers may be provided, the carriers of the several rows being provided with wheels 22 that are adapted to run in tracks 23 on floor 1.

The pulleys 16 and 17 are on the opposite ends of shafts 25, 26 (only one end being shown in Fig. 1) and the ropes 18 therefor are duplicated for each set of pulleys 16, 17, it being understood that each set is below each of the rails 13 that support each set of rollers 14. The frame that carries arms 20 is preferably rectangular, and the arms 20 seen in Fig. 1 are duplicated at the opposite end of the frame so that the lower ends of such pairs of arms will be at opposite ends of each carrier 21.

The tracks 13 may each carry extension arms 27 at both ends thereof hingedly supported for swinging to dot-dash positions 28 (Fig. 1) by any suitable mechanism between tracks 13 as generally indicated at 29 in Fig. 1. All this structure relating to the hoist device is as shown and described in detail in the above mentioned patent, and is not claimed herein.

Extending between the opposite sides of frame 2 and secured at its ends to any suitable side frame members 30 (Fig. 1) may be a pair of overhead cross-frame members 31, 32 (Fig. 2), one of which carries a pair of vertical opposed arms 32 rigidly secured at one of their ends thereto and depending therefrom.

Figure 2:
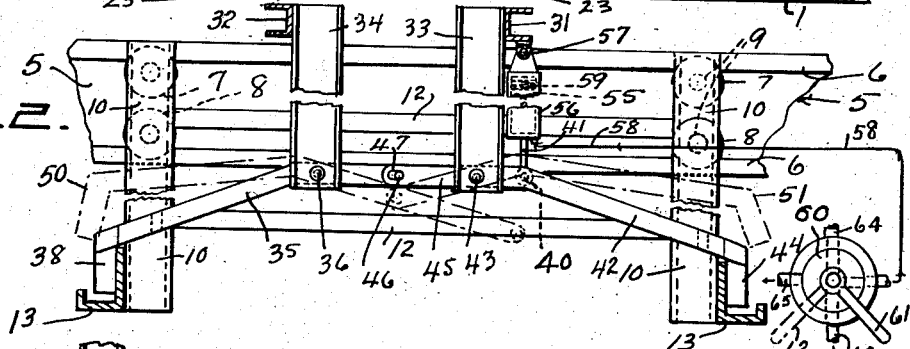
Fig. 2 is a fragmentary enlarged side view of the locking apparatus with the hoist device of Fig. 1 omitted for purpose of clarity, and said view also diagrammatically shows the connection between the locking apparatus and the brake system of the vehicle. The rails and cross frame members are in section.

Extending between opposite sides of frame 2 and secured at opposite ends thereof to any suitable side frame members 30 (Fig. 1) may be a pair of overhead cross members 31, 32 (Fig. 2). The cross member 31 carries a pair of spaced opposed arms 33 depending therefrom and rigidly secured thereto, while cross member 32 carries a similar pair of spaced opposed arms 34. The arms 33, 34 may be at any points along cross members 31, 32, but they are preferably near a point intermediate the opposite ends of said members.

The locking device for holding the carriage that is on rail members 5 stationary and for holding the hoist device 15 stationary on said carriage includes the arms 33, 34, but the direct connection whereby the desired results are accomplished comprises a locking means pivotally supported on said arms 33, 34.

Figure 3:
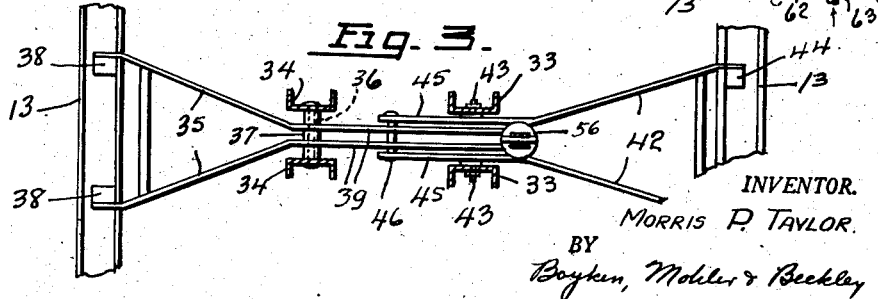
Fig. 3 is a plan view of the locking apparatus of Fig. 2, one corner of which is broken away. The supporting arms and part of the cylinder support are indicated in section.

The above mentioned locking means comprises a pair of opposed lever arms 35 pivoted intermediate their ends by horizontal pivot 36 to the lower ends of arms 34 (Figs. 2, 3). The lever arms extend between the said lower ends of arms 34 and the pivot may be carried at its ends by said latter arms, while a spacer 37 on said pivot may space and connect said arms at the same time. One of the corresponding end portions of arms 35 extend divergently from arms 34 toward and over one of the rails 13 (Fig. 2) and the outer ends of said arms 35 carry blocks 38 that are adapted to fit in said rails between rollers 14 (Fig. 1). Thus upon downward movement of the end portions 39 of arms 35 that extend from the sides of arms 34 that are opposite the sides from which the diverging portions extend, the said blocks will be moved upwardly and out of rails 13 to free the one set of wheels 14 for movement on said rails.

The said portions 39 of arms 35 extend from arms 34 between arms 33 and past the latter, terminating in outer ends that are pivotally secured by pivot 40 to the lower end of a power actuated reciprocable piston rod 41 (Figs. 2, 3).

As second pair of lever arms 42 extend between the lower ends of arms 33 and are respectively pivotally supported at a point intermediate their respective ends to the lower ends of said arms 33 by pivots 43. These arms extend divergently at one of their ends from the arms 33 toward and over the other rail 13 that is nearest said latter arms, and the outer ends of arms 42 carry blocks 44 adapted to move into and out of said last mentioned rail and between the rollers 14 of the hoist device that are adapted to be supported on said rail. Thus provision is made for blocking movement of both sets of rollers 14 that are on each of the rails 13.

The opposite end portions 45 of arms 43, or the portions extending toward arms 34 are at opposite outer sides of the portions 39 of arms 35 and the said portions 35, 39 are pivotally secured together at a point between arms 33, 34 by pivot 46. The portions 45 may be slotted, as at 47 (Fig. 2) for said pivot, or the pivot may be secured to portions 45 and portions 39 may be slotted, if desired.

From the foregoing description it will be seen that a downward thrust of piston rod 41 will result in simultaneously raising the blocks 38, 44 out of their positions between the rollers 14 of each set thereof to dot-dash positions 50, 51, thereby freeing the hoist device for movement on rails 13 and at the same time freeing the carriage for movement on rail members 5. But as long as the blocks are in the rails 13 both the hoist device and the carriage will be locked against movement in the vehicle. Upon upward movement of the piston rod 41 the blocks 38, 44 will be lowered into rails 13 for locking the hoist device and carriage.

Inasmuch as the vehicle that carries the hoist device and carriage may be a railway car or other vehicle that may be closed and unattended for considerable periods of time during transit, it is obvious that a great deal of damage could result to freight in such vehicle and to the hoist, carriage and vehicle itself, unless the hoist device and carriage were positively locked before the vehicle brakes were released and the vehicle set in motion.

To insure against the above possibility of drainage, the piston rod 41 is carried on a piston 55 that is reciprocable in cylinder 56. This cylinder is pivoted to cross member 31, as at 57, and an air line 58 communicates with the lower end of the cylinder below piston 55 while a spring 59 above the piston tends to force the latter down when air pressure below the piston is released.

The air pressure line 58 extends to a manually actuated valve 60, which valve has a handle 61 for manually actuating the same from the full line position of Fig. 2 to the dot-dash position 62. An air pressure line 63 communicates between the valve and the conventional brake pipe (not shown) while another air pressure line 64 communicates between the valve and the auxiliary pressure tank (not shown) that supplies air to the brake mechanism of the vehicle for applying the brakes. An air outlet to the atmosphere is provided on valve 60 at 65.

In the drawing the movable valve plug is in a position in which air from the auxiliary cylinder (which always carries air under pressure) is in communication with cylinder 56 and the piston 55 is elevated and is so held by the constant air pressure, whereby blocks 38, 44 are held locked to rails 13 locking the hoist device 15 and the main carriage against movement.

In order to load or unload the car when the latter is positioned for loading or for unloading, the car is opened and the operator swings the valve handle 61 to dot-dash position 62 whereupon the brake line 63 is exhausted through the outlet 65, thereby setting the brakes on the car if they are not already set, and at the same time exhausting the line 58 to permit spring 59 to force piston rod 41 downwardly for releasing the blocks 38, 44. The hoist device and carriage are now free to move, and the car cannot be started again until the brake line 63 is closed to thereby permit building up pressure in said line. Hence, should the operator close the car and forget to lock the hoist device and carriage by manipulation of valve handle 61, the car cannot be moved until such manipulation is made. This is an important feature of the invention.

Having described the invention, I claim:

1. In a vehicle having a floor and an upstanding frame secured thereto, an overhead track carried by said frame, a freight hoist device supported on said track for movement longitudinally of the latter back and forth between the ends thereof, means carried by said frame for releasably securing said device against such movement, said freight hoist device including a carriage supported on said frame for movement over said floor in a direction at right angles to said first mentioned movement.

2. In a vehicle having a floor and an upstanding frame secured thereto and a braking mechanism for holding it stationary, an overhead track carried by said frame, a freight hoist device supported on said track for movement longitudinally of the latter, means operated by the braking mechanism of the vehicle for locking and unlocking said carriage against such movement.

3. In a vehicle having a floor and an upstanding frame secured thereto, an overhead track comprising a pair of parallel spaced rail members carried by said frame, a carriage provided with rollers supported on said rail members for movement of said carriage longitudinally of the latter, said carriage comprising a pair of parallel rails extending between said rail members, a hoist provided with rollers supported on said rails for movement of said hoist on said rails transversely of said members, means carried by said frame securing said carriage and said hoist against said movement on said members and on said rails.

4. In a vehicle having a floor and an upstanding frame secured thereto, an overhead track comprising a pair of parallel spaced rail members carried by said frame, a carriage provided with rollers supported on said rail members for movement of said carriage longitudinally of the latter, said carriage comprising a pair of parallel rails extending between said rail members, a hoist provided with rollers supported on said rails for movement of said hoist on said rails transversely of said members, means operated by the braking mechanism of the vehicle for locking and for unlocking said carriage and said hoist against said movement on said members and on said rails.

5. In a vehicle having a floor and an upstanding frame secured thereto, an overhead track supported at two opposite sides of said vehicle on said frame for movably supporting a carriage extending across said vehicle between said sides, a carriage so supported on said track, said carriage including a pair of rails extending transversely of said track and between said sides, a hoist device supported on said rails for movement longitudinally of the latter, rollers on said hoist device rotatable on said rails for so supporting said device, locking means movable into and out of the path of said rollers for obstructing movement thereof on said rails and for holding said hoist device stationary on said rails, and means for so moving said locking means.

6. In a vehicle having a floor and an upstanding frame secured thereto, an overhead track supported at two opposite sides of said vehicle on said frame for movably supporting a carriage extending across said vehicle between said sides, a carriage so supported on said track, said carriage including a pair of rails extending transversely of said track and between said sides, a hoist device supported on said rails for movement longitudinally of the latter, rollers on said hoist device rotatable on said rails for so supporting said device, locking means movable into and out of the path of said rollers for obstructing movement thereof on said rails and for holding said hoist device stationary on said rails, and air pressure actuated means for so moving said locking means including a manually manipulatable valve.

7. In a vehicle having a floor and an upstanding frame secured thereto, an overhead track supported at two opposite sides of said vehicle on said frame for movably supporting a carriage extending across said vehicle between said sides, a carriage so supported on said track, said carriage including a pair of rails extending transversely of said track and between said sides, a hoist device supported on said rails for movement longitudinally of the latter, rollers on said hoist device rotatable on said rails for so supporting said device, locking means movable into and out of engagement with said rails for locking said carriage against said movement thereof, and means for so moving said locking means.

8. In a vehicle having a floor and an upstanding frame secured thereto, an overhead track supported at two opposite sides of said vehicle on said frame for movably supporting a carriage extending across said vehicle between said sides, a carriage so supported on said track, said carriage including a pair of rails extending transversely of said track and between said sides, a hoist device supported on said rails for movement longitudinally of the latter, rollers on said hoist device rotatable on said rails for so supporting said device, a pair of arms supported on said frame for swinging into and out of engagement with said rails for holding said carriage against movement on said tracks, means for simultaneously so swinging said arms including means operated by the braking mechanism of the vehicle.

MORRIS P. TAYLOR.